(12) United States Patent
Shinoda et al.

(10) Patent No.: US 12,021,233 B2
(45) Date of Patent: Jun. 25, 2024

(54) POSITIVE ELECTRODE STRUCTURE AND SECONDARY BATTERY

(71) Applicant: DAIKIN INDUSTRIES, LTD., Osaka (JP)

(72) Inventors: Chihiro Shinoda, Osaka (JP); Takahiro Kitahara, Osaka (JP); Kazuki Hosoda, Osaka (JP); Yuma Ichinose, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 652 days.

(21) Appl. No.: 17/282,552

(22) PCT Filed: Sep. 30, 2019

(86) PCT No.: PCT/JP2019/038619
§ 371 (c)(1),
(2) Date: Apr. 2, 2021

(87) PCT Pub. No.: WO2020/071336
PCT Pub. Date: Apr. 9, 2020

(65) Prior Publication Data
US 2021/0376319 A1    Dec. 2, 2021

(30) Foreign Application Priority Data

Oct. 3, 2018    (JP) .............................. 2018-188099

(51) Int. Cl.
| | |
|---|---|
| *H01M 4/525* | (2010.01) |
| *H01M 4/36* | (2006.01) |
| *H01M 4/62* | (2006.01) |
| *H01M 4/64* | (2006.01) |
| *H01M 4/70* | (2006.01) |
| *H01M 4/02* | (2006.01) |

(52) U.S. Cl.
CPC ........... *H01M 4/525* (2013.01); *H01M 4/364* (2013.01); *H01M 4/623* (2013.01); *H01M 4/64* (2013.01); *H01M 4/70* (2013.01); *H01M 2004/028* (2013.01)

(58) Field of Classification Search
CPC ...... H01M 4/525; H01M 4/364; H01M 4/623; H01M 4/04
See application file for complete search history.

(56) References Cited

U.S. PATENT DOCUMENTS

| | | | |
|---|---|---|---|
| 2004/0146781 A1* | 7/2004 | Ohsawa ................ | H01M 4/623 429/210 |
| 2008/0131776 A1 | 6/2008 | Sakuma et al. | |
| 2008/0241705 A1 | 10/2008 | Wakita et al. | |
| 2010/0266882 A1 | 10/2010 | Igarashi et al. | |
| 2011/0104569 A1 | 5/2011 | Sugaya et al. | |
| 2011/0318638 A1 | 12/2011 | Koh et al. | |
| 2014/0093761 A1 | 4/2014 | Sakanaka et al. | |
| 2015/0017532 A1 | 1/2015 | Iguchi et al. | |
| 2015/0137028 A1 | 5/2015 | Ichisaka et al. | |
| 2015/0137029 A1 | 5/2015 | Ichisaka et al. | |
| 2015/0340732 A1* | 11/2015 | Kim ...................... | H01M 4/366 429/246 |
| 2016/0190593 A1 | 6/2016 | Nomura et al. | |
| 2019/0296359 A1 | 9/2019 | Asano et al. | |
| 2020/0006774 A1 | 1/2020 | Horiuchi et al. | |
| 2021/0028462 A1 | 1/2021 | Nomura et al. | |

FOREIGN PATENT DOCUMENTS

| | | | | |
|---|---|---|---|---|
| CN | 101107281 | A | 1/2008 | |
| CN | 103094560 | A | 5/2013 | |
| EP | 2 398 095 | A1 | 12/2011 | |
| EP | 3 070 764 | A1 | 9/2016 | |
| JP | 11195419 | A * | 7/1999 | ............ H01M 4/621 |
| JP | 2001-085060 | A | 3/2001 | |
| JP | 2003-151558 | A | 5/2003 | |
| JP | 2008-218385 | A | 9/2008 | |
| JP | 2013-149370 | A | 8/2013 | |
| JP | 5366823 | B2 | 12/2013 | |
| JP | 5494497 | B2 | 5/2014 | |
| JP | 5625917 | B2 | 11/2014 | |

(Continued)

OTHER PUBLICATIONS

Machine Translation of: JP 11-195419 A, Kuzuo et al., Jul. 21, 1999.*
Extended European Search Report dated Jun. 10, 2022, issued in corresponding European Application No. 19869139.6.
International search report for PCT/JP2019/038619 dated Dec. 17, 2019.
International Preliminary Report on Patentability with translation of Written Opinion dated Mar. 23, 2021, in International Application No. PCT/JP2019/038619.

*Primary Examiner* — Kenneth J Douyette

(74) *Attorney, Agent, or Firm* — Sughrue Mion, PLLC

(57) ABSTRACT

Provided is a positive electrode structure including a current collector and a positive electrode mixture layer provided on one or each of both sides of the current collector, wherein the positive electrode mixture layer has a thickness of 69 μm or more, the positive electrode mixture layer has a density of 3.0 to 5.0 g/cm³, the positive electrode mixture layer includes a positive electrode active material and a binder, the positive electrode active material includes a lithium-nickel composite oxide, the binder includes a fluorine-containing copolymer, the fluorine-containing copolymer contains a vinylidene fluoride unit and a fluorinated monomer unit (excluding the vinylidene fluoride unit), and the fluorine-containing copolymer has a storage modulus (E') at 30° C. of 100 to 1,100 MPa and a storage modulus (E') at 60° C. of 50 to 500 MPa, as measured by dynamic viscoelasticity.

9 Claims, No Drawings

(56) References Cited

FOREIGN PATENT DOCUMENTS

| | | |
|---|---|---|
| JP | 2015-109154 A | 6/2015 |
| JP | 2016-126852 A | 7/2016 |
| JP | 5949914 B2 | 7/2016 |
| JP | 5949915 B2 | 7/2016 |
| JP | 2017-117754 A | 6/2017 |
| JP | 2017-147206 A | 8/2017 |
| JP | 6269890 B1 | 1/2018 |
| JP | 2018-152293 A | 9/2018 |
| KR | 10-2007-0110006 A | 11/2007 |
| KR | 10-2014-0090097 A | 7/2014 |
| TW | 201432980 A | 8/2014 |
| WO | 2006/080259 A1 | 8/2006 |
| WO | 2011/002097 A1 | 1/2011 |
| WO | 2015/151501 A1 | 10/2015 |
| WO | 2018/066430 A1 | 4/2018 |

* cited by examiner

POSITIVE ELECTRODE STRUCTURE AND SECONDARY BATTERY

CROSS-REFERENCE TO RELATED APPLICATIONS

This application is a National Stage of International Application No. PCT/JP2019/038619 filed Sep. 30, 2019, which claims priority under U.S.C. § 119(a) to Japanese Patent Application No. JP 2018-188099 filed on Oct. 3, 2018.

TECHNICAL FIELD

The present disclosure relates to a positive electrode structure and a secondary battery.

BACKGROUND ART

Non-aqueous electrolyte secondary batteries such as lithium ion secondary batteries are used for small electric/electronic devices suitable for carrying such as laptop computers, mobile phones, smartphones, tablet personal computers, and ultrabooks, because of their high voltage, high energy density, low self-discharge, low memory effect, and ultra-lightweight, and they are further being put to practical use as a wide range of power sources such as in-vehicle power sources for driving automobiles or the like and large stationary power sources.

For example, Patent Document 1 discloses a lithium secondary battery comprising a positive electrode, a negative electrode, a non-aqueous electrolyte, and a separator, and a hollow columnar battery case enclosing these members, wherein the positive electrode has a positive electrode mixture layer containing a positive electrode active material, a conductive additive, and a binder on one or each of both sides of a current collector, the positive electrode active material is a lithium-containing composite oxide represented by Formula (1) below:

$$Li_{1+y}MO_2 \quad (1)$$

wherein $-0.15 \leq y \leq 0.15$ is satisfied, and M represents an element group containing three or more elements including at least Ni, Co, and Mn, and $25 \leq a \leq 90$, $5 \leq b \leq 35$, $5 \leq c \leq 35$, and $10 \leq b+c \leq 70$ are satisfied in the elements constituting M, wherein a, b, and c represent the proportions of Ni, Co, and Mn (mol %), respectively, and the molar composition ratio of the total amount of Ni in the total positive electrode active material is 0.05 to 0.5 with respect to all the metals except Li.

RELATED ART

Patent Document

Patent Document 1: Japanese Patent Application Laid-Open No. 2013-149370

SUMMARY OF THE INVENTION

Problem to be Solved by the Invention

It is an object of the present disclosure to provide a positive electrode structure with a configuration that is suitable for lithium ion secondary batteries and enables high capacity.

Means for Solving the Problem

The present disclosure provides a positive electrode structure comprising a current collector and a positive electrode mixture layer provided on one or each of both sides of the current collector, wherein the positive electrode mixture layer has a thickness of 69 μm or more, the positive electrode mixture layer has a density of 3.0 to 5.0 g/cm$^3$, the positive electrode mixture layer comprises a positive electrode active material and a binder, the positive electrode active material comprises a lithium-nickel composite oxide, the binder comprises a fluorine-containing copolymer, the fluorine-containing copolymer comprises a vinylidene fluoride unit and a fluorinated monomer unit, provided that the vinylidene fluoride unit is excluded from the fluorinated monomer.

In the positive electrode structure of the present disclosure, the fluorine-containing copolymer preferably has a storage modulus (E') at 30° C. of 100 to 1,100 MPa and a storage modulus (E') at 60° C. of 50 to 500 MPa, as measured by dynamic viscoelasticity.

In the positive electrode structure of the present disclosure, the content of the vinylidene fluoride unit in the fluorine-containing copolymer is preferably 57.0 mol % or more with respect to all monomer units.

In the positive electrode structure of the present disclosure, the content of the fluorinated monomer unit in the fluorine-containing copolymer is preferably 5.0 mol % or more with respect to all monomer units.

In the positive electrode structure of the present disclosure, the content of the binder is preferably 0.3 to 3.0 mass % with respect to the mass of the positive electrode mixture layer.

In the positive electrode structure of the present disclosure, the positive electrode mixture layer is preferably formed by applying a positive electrode mixture containing the positive electrode active material, the binder, and an organic solvent, and the amount of the positive electrode mixture applied is preferably 22.0 mg/cm$^2$ or more.

In the positive electrode structure of the present disclosure, the fluorine-containing copolymer preferably has a melting point of 100 to 170° C.

In the positive electrode structure of the present disclosure, the content of the fluorine-containing copolymer in the binder is preferably 5 mass % or more with respect to the mass of the binder.

Further, the present disclosure provides a secondary battery having the aforementioned positive electrode structure.

Effects of Invention

The present disclosure can provide a positive electrode structure with a configuration that is suitable for lithium ion secondary batteries and enables higher capacity.

DESCRIPTION OF EMBODIMENTS

Hereinafter, specific embodiments of the present disclosure will be described in detail, but the present disclosure is not limited to the following embodiments.

The positive electrode structure of the present disclosure comprises a current collector and a positive electrode mixture layer provided on one or each of both sides of the current collector, wherein the positive electrode mixture layer has a thickness of 69 μm or more, the positive electrode mixture layer has a density of 3.0 to 5.0 g/cm$^3$, and the positive electrode mixture layer comprises a lithium-nickel composite oxide as a positive electrode active material.

The thick and high-density positive electrode mixture layer of the positive electrode structure of the present disclosure can be formed by preparing a positive electrode mixture that contains a binder, a conductive additive, or the like as little as possible and contains an increased amount of a lithium-nickel composite oxide, coating a current collector with the positive electrode mixture to a large thickness, and pressing the coating film at high pressure.

However, when coating the positive electrode current collector with the positive electrode mixture to a large thickness and pressing the coating film at high pressure in order to form a thick and high-density positive electrode mixture layer using a lithium-nickel composite oxide as a positive electrode active material, a press film to be obtained tends to crack, which has been a problem. Further, when the press film to be obtained is wound up, the press film further tends to crack. In particular, as the diameter of the winding core is reduced in order to increase the capacity and reduce the size of the lithium ion secondary battery, the bending radius of the positive electrode structure to be wound up is also reduced, and the press film further tends to crack at the time of winding. This tendency is more remarkable when the amount of binder in the positive electrode mixture is reduced. Accordingly, any positive electrode structure has not been known that includes a positive electrode mixture layer having a thickness and a density within the aforementioned ranges despite containing a lithium-nickel composite oxide as a positive electrode active material.

Since the positive electrode structure of the present disclosure includes a positive electrode mixture layer having a thickness and a density within the aforementioned ranges while containing a lithium-nickel composite oxide, use of the positive electrode structure of the present disclosure for lithium ion secondary batteries can further increase the capacity of lithium ion secondary batteries.

The positive electrode mixture layer has a thickness of 69 μm or more, preferably 71 μm or more, more preferably 74 μm or more, and preferably 170 μm or less, more preferably 150 μm or less, for further increasing the capacity.

The thickness of the positive electrode mixture layer can be measured with a micrometer gauge.

The positive electrode mixture layer has a density of 3.0 to 5.0 g/cm³, preferably 3.2 to 5.0 g/cm³, more preferably 3.5 to 5.0 g/cm³, for further increasing the capacity.

The density of the positive electrode mixture layer can be calculated from the mass and the volume of the positive electrode mixture layer.

The positive electrode mixture layer of the positive electrode structure of the present disclosure may be provided on one or each of both sides of the positive electrode current collector. The thickness of the positive electrode mixture layer of the present disclosure is a thickness per side, in the case where the positive electrode mixture layer is provided on each of both sides of the positive electrode current collector.

The thick and high-density positive electrode mixture layer as described above means that it is a layer provided on the positive electrode current collector separately from the positive electrode current collector and obtained substantially by coating the positive electrode current collector with the positive electrode mixture, followed by drying and pressing. That is, the positive electrode mixture layer of the positive electrode structure of the present disclosure is suitably produced by coating the positive electrode current collector with the positive electrode mixture, followed by drying and pressing.

Positive Electrode Active Material

In the positive electrode structure of the present disclosure, the positive electrode mixture layer comprises a lithium-nickel composite oxide as a positive electrode active material.

The positive electrode active material is preferably a lithium-nickel composite oxide represented by Formula (1):

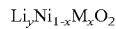

wherein x satisfies $0.01 \leq x \leq 0.5$, y satisfies $0.9 \leq y \leq 1.2$, and M represents a metal atom (provided that Ni is excluded from the metal atom). Such a positive electrode active material containing a large amount of Ni is beneficial for increasing the capacity of secondary batteries.

In Formula (1), x is a coefficient satisfying $0.01 \leq x \leq 0.5$, preferably $0.05 \leq x \leq 0.4$, further preferably $0.10 \leq x \leq 0.3$, in view of obtaining secondary batteries with higher capacity.

In Formula (1), examples of the metal atom represented by M include V, Ti, Cr, Mn, Fe, Co, Cu, Al, Zn, Mg, Ga, Zr, and Si. The metal atom represented by M is preferably a transition metal such as V, Ti, Cr, Mn, Fe, Co, and Cu, or a combination of the transition metal with another metal such as Al, Ti, V, Cr, Mn, Fe, Co, Cu, Zn, Mg, Ga, Zr, and Si.

The positive electrode active material is preferably at least one selected from the group consisting of $LiNi_{0.82}Co_{0.15}Al_{0.03}O_2$, $LiNi_{0.6}Mn_{0.2}Co_{0.2}O_2$, and $LiNi_{0.8}Mn_{0.1}Co_{0.1}O_2$, more preferably at least one selected from the group consisting of $LiNi_{0.82}Co_{0.15}Al_{0.03}O_2$ and $LiNi_{0.8}Mn_{0.1}Co_{0.1}O_2$.

The lithium-nickel composite oxide represented by Formula (1) may be combined with a different positive electrode active material. Specifically, examples of the different positive electrode active material include $LiCoO_2$, $LiMnO_2$, $LiMn_2O_4$, $Li_2MnO_3$, $LiMn_{1.8}Al_{0.2}O_4$, $Li_4Ti_5O_{12}$, $LiFePO_4$, $Li_3Fe_2(PO_4)_3$, $LiFeP_2O_7$, $LiCoPO_4$, $Li_{1.2}Fe_{0.4}Mn_{0.4}O_2$, $LiNiO_2$, and $LiNi_{0.5}Mn_{0.3}Co_{0.2}O_2$.

Further, the positive electrode active material used can be a positive electrode active material having a surface onto which another substance is attached, the substance having compositional features different from that of the substance forming the main positive electrode active material. Examples of the substance attached to the surface include oxides such as aluminum oxide, silicon oxide, titanium oxide, zirconium oxide, magnesium oxide, calcium oxide, boron oxide, antimony oxide, and bismuth oxide, sulfates such as lithium sulfate, sodium sulfate, potassium sulfate, magnesium sulfate, calcium sulfate, and aluminum sulfate, and carbonates such as lithium carbonate, calcium carbonate, and magnesium carbonate.

Such a substance can be attached onto the surface of the positive electrode active material, for example, by a method including dissolving or suspending the substance in a solvent and impregnating the positive electrode active material with the solution to add the substance thereto, followed by drying, a method including dissolving or suspending a precursor of the substance in a solvent, impregnating the positive electrode active material with the solution to add the substance thereto, and causing a reaction by heating or the like, or a method including adding the substance to a precursor of the positive electrode active material and firing together.

The amount of the substance to be used is preferably 0.1 ppm or more, more preferably 1 ppm or more, further preferably 10 ppm or more, preferably 20% or less, more preferably 10% or less, further preferably 5% or less, with respect to the mass of the positive electrode active material. The surface-attached substance can suppress oxidation reaction of the non-aqueous electrolyte on the surface of the positive electrode active material to improve the lifetime of the battery. However, in the case where the amount attached is excessively small, the effect is not sufficiently exerted, and in the case where the amount is excessively large, the resistance may increase because it inhibits the entry and exit of lithium ions.

Examples of the shape of the particles of the positive electrode active material to be used include bulk, polyhedral, spherical, ellipsoidal, plate, needle, and columnar shapes, as conventionally used. In particular, a positive electrode active material in which primary particles aggregate to form spherical or ellipsoidal secondary particles is preferable. Generally, since the active material in the electrode expands and contracts with charge and discharge of electrochemical elements, deterioration such as destruction of the active material and breakage of the conductive path due to the stress is likely to occur. Therefore, a case where primary particles aggregate to form secondary particles is more preferable than a case where an active material consists of single particles, which are primary particles, in view of relieving the stress of expansion and contraction to prevent deterioration. Further, it is preferable that the particles have a spherical or ellipsoidal shape rather than a plate shape or the like that tend to be axially oriented. The particles having a spherical or ellipsoidal shape are unlikely to be oriented when forming an electrode to result in small expansion and contraction of the electrode during charging and discharging, and it is also easy to uniformly mix the particles having a spherical or ellipsoidal shape with a conductive additive when producing the electrode.

The positive electrode active material generally has a tapped density of 1.3 $g/cm^3$ or more, preferably 1.5 $g/cm^3$ or more, further preferably 1.6 $g/cm^3$ or more, most preferably 1.7 $g/cm^3$ or more. When the tapped density of the positive electrode active material falls below such a lower limit, the amount of the dispersion medium necessary for forming the positive electrode active material layer increases, and the necessary amounts of the conductive additive and binder also increase, so that the filling ratio of the positive electrode active material in the positive electrode mixture layer may be restricted to thereby restrict the battery capacity. Use of a positive electrode active material with high tapped density enables forming a high-density positive electrode mixture layer. Generally, the higher the tapped density, the more preferable it is, and there is no particular upper limit. However, an excessively high tapped density may be a rate-determining factor of the diffusion of lithium ions through the non-aqueous electrolyte in the positive electrode mixture layer to result in deterioration in the load characteristics. Therefore, the tapped density is generally 2.5 $g/cm^3$ or less, preferably 2.4 $g/cm^3$ or less.

The tapped density of the positive electrode active material is defined as a density determined from the volume and the weight of a sample measured by passing the sample through a sieve with an opening size of 300 μm and dropping into a 20-$cm^3$ tapping cell to fill the cell capacity and thereafter performing tapping with a stroke length of 10 mm 1,000 times using a powder density-measuring instrument (such as a tap denser, available from Seishin Enterprise Co., Ltd).

The particles of the positive electrode active material have a median diameter d50 (the size of secondary particles, in the case where primary particles aggregate to form secondary particles) of generally 0.1 μm or more, preferably 0.5 μm or more, more preferably 1 μm or more, most preferably 3 μm or more, and generally 20 μm or less, preferably 18 μm or less, more preferably 16 μm or less, most preferably 15 μm or less. When the diameter falls below such a lower limit, the positive electrode active material may fail to have a high-bulk density. When the diameter exceeds such an upper limit, diffusion of lithium within the particles takes time, so that the battery performance may decrease, or problems such as streaks may occur when producing the positive electrode of the battery, that is, when the positive electrode active material is slurried together with a conductive additive, a binder, or the like in a solvent and applied in a form of a thin film. Here, two or more positive electrode active materials having different median diameters d50 can also be mixed to further improve the filling property when producing the positive electrode.

The median diameter d50 in the present disclosure is measured using a known laser diffraction/scattering particle size distribution measurement apparatus. In the case of using LA-920, available from HORIBA, Ltd., as a particle size distribution analyzer, measurement is performed by setting the measurement refractive index to 1.24, after ultrasonic dispersion for 5 minutes using a 0.1-mass % sodium hexametaphosphate aqueous solution as a dispersion medium used in measurement.

In the case where primary particles aggregate to form secondary particles, the primary particles of the positive electrode active material have an average diameter of generally 0.01 μm or more, preferably 0.05 μm or more, further preferably 0.08 μm or more, most preferably 0.1 μm or more, and generally 3 μm or less, preferably 2 μm or less, further preferably 1 μm or less, most preferably 0.6 μm or less. When the average diameter exceeds such an upper limit, it is difficult to form spherical secondary particles, thereby adversely affecting the powder filling property or greatly reducing the specific surface area, which may increase the possibility of reduction in battery performance such as output characteristics. Conversely, when the average diameter falls below such a lower limit, problems such as inferior charge/discharge reversibility may occur because the crystals are generally underdeveloped. The diameter of the primary particles is measured by observation using a scanning electron microscope (SEM). Specifically, the diameter is determined by determining the maximum length between the left and right boundaries along the horizontal straight line in an image at a magnification of 10,000 for each of any 50 primary particles and averaging the values.

The positive electrode active material has a BET specific surface area of generally 0.2 $m^2/g$ or more, preferably 0.3 $m^2/g$ or more, further preferably 0.4 $m^2/g$ or more, and generally 4.0 $m^2/g$ or less, preferably 2.5 $m^2/g$ or less, further preferably 1.5 $m^2/g$ or less. When the BET specific surface area falls below such a range, the battery performance tends to decrease. When it exceeds the range, the tapped density is difficult to be large, so that problems with the coating property of the positive electrode mixture may easily occur.

The BET specific surface area is defined as a value measured for a sample pre-dried under nitrogen circulate at 150° C. for 30 minutes using a surface area meter (for example, a fully automatic surface area measuring device, available from Ohkura Riken Co., Ltd.) by the single point BET nitrogen adsorption by the gas flow method using a nitrogen-helium mixed gas accurately adjusted so that the relative pressure value of nitrogen to the atmospheric pressure is 0.3.

A method that is common as a method for producing an inorganic compound is used as the method for producing the positive electrode active material. In particular, various methods are conceivable for producing a spherical or ellipsoidal active material. Examples thereof include: a method for obtaining an active material by dissolving or milling and dispersing a transition metal raw material such as transition metal nitrates and sulfates together with raw materials of other elements, as needed, in a solvent such as water, adjusting the pH under stirring to produce a spherical precursor, recovering it, followed by drying, as required, thereafter adding a Li source such as LiOH, $Li_2CO_3$, and $LiNO_3$ thereto, and firing the mixture at a high temperature; a method for obtaining an active material by dissolving or milling and dispersing a transition metal raw material such as transition metal nitrates, sulfates, hydroxides, and oxides together with raw materials of other elements, as needed, in a solvent such as water, subjecting the resultant to drying and forming with a spray dryer or the like to produce a spherical or ellipsoidal precursor, adding a Li source such as LiOH, $Li_2CO_3$, and $LiNO_3$ thereto, and firing the mixture at a high temperature; and a method for obtaining an active material by dissolving or milling and dispersing a transition metal raw material such as transition metal nitrates, sulfates, hydroxides, and oxides together with a Li source such as LiOH, $Li_2CO_3$, and $LiNO_3$ and raw materials of other elements, as needed, in a solvent such as water, subjecting the resultant to drying and forming with a spray dryer or the like to produce a spherical or ellipsoidal precursor, and firing the precursor at a high temperature.

One positive electrode active material may be used alone, or two or more positive electrode active materials with different compositional features or different powder physical properties may be used in any combination at any ratio.

The content of the positive electrode active material in the positive electrode mixture layer is preferably 96.0 to 99 mass %, more preferably 96.5 to 98.9 mass %, further preferably 97.0 to 98.8 mass %, with respect to the mass of the positive electrode mixture layer, in view of obtaining further excellent adhesion between the positive electrode mixture layer and the positive electrode current collector, forming the positive electrode mixture layer with still higher density, and also involving no increase in the electrical resistance of the positive electrode.

Binder

The positive electrode mixture layer comprises a fluorine-containing copolymer containing a vinylidene fluoride unit (VdF unit) and a fluorinated monomer unit (provided that the VdF unit is excluded from the fluorinated monomer unit) as a binder.

The fluorinated monomer (provided that the VdF is excluded from the fluorinated monomer unit) is preferably at least one selected from the group consisting of tetrafluoroethylene (TFE), vinyl fluoride, trifluoroethylene, chlorotrifluoroethylene (CTFE), fluoroalkyl vinyl ether, hexafluoropropylene (HFP), (perfluoroalkyl)ethylene, 2,3,3,3-tetrafluoropropene, and trans-1,3,3,3-tetrafluoropropene, more preferably at least one selected from the group consisting of TFE, CTFE, and HFP, further preferably at least one selected from the group consisting of TFE and HFP, in view of obtaining a positive electrode structure that has still larger thickness and higher density and is more difficult to crack when wound up, and the fluorinated monomer is particularly preferably TFE, in view of suppressing the swelling in the electrolyte to improve the battery characteristics.

The fluorinated monomer unit (provided that the VdF unit is excluded from the fluorinated monomer unit) may or may not have a polar group.

The content of the VdF unit in the fluorine-containing copolymer is preferably 57.0 mol % or more, more preferably 60.0 mol % or more, further preferably 63.0 mol % or more, and preferably 95.0 mol % or less, further preferably 90.0 mol % or less, most preferably 85.0 mol % or less, with respect to all monomer units.

The content of the fluorinated monomer unit (provided that the VdF unit is excluded from the fluorinated monomer unit) in the fluorine-containing copolymer is preferably 5.0 mol % or more, more preferably 8.0 mol % or more, particularly preferably 10.0 mol % or more, most preferably 15 mol % or more, and preferably 43.0 mol % or less, more preferably 40.0 mol % or less, further preferably 38.0 mol % or less, particularly preferably 37.0 mol % or less, with respect to all monomer units.

Herein, the compositional features of the fluorine-containing copolymer can be determined, for example, by $^{19}$F-NMR measurement.

The fluorine-containing copolymer may further contain a non-fluorinated monomer unit. Examples of the non-fluorinated monomer include non-fluorinated monomers having no polar group such as ethylene and propylene, and non-fluorinated monomers having a polar group (which may be hereinafter referred to as polar group-containing monomers).

Use of a non-fluorinated monomer having a polar group allows the polar group to be introduced into the fluorine-containing copolymer, whereby more excellent adhesion between the positive electrode mixture layer and the current collector is obtained. The polar group that can be contained in the fluorine-containing copolymer is preferably at least one selected from the group consisting of a carbonyl group-containing group, an epoxy group, a hydroxy group, a sulfonate group, a sulfate group, a phosphate group, an amino group, an amide group, and an alkoxy group, more preferably at least one selected from the group consisting of a carbonyl group-containing group, an epoxy group, and a hydroxy group, further preferably a carbonyl group-containing group. The aforementioned hydroxy group does not include the hydroxy group as a part of the aforementioned carbonyl group-containing group. Further, the aforementioned amino group is a monovalent functional group obtained by removing hydrogen from ammonia or primary or secondary amine.

The aforementioned carbonyl group-containing group is a functional group having a carbonyl group (—C(=O)—). The aforementioned carbonyl group-containing group is preferably a carboxylic acid anhydride group or a group represented by Formula: —COOR, wherein R represents a hydrogen atom, an alkyl group, or a hydroxyalkyl group, in view of obtaining further excellent adhesion between the positive electrode mixture layer and the current collector. The alkyl group and the hydroxyalkyl group preferably have 1 to 16, more preferably 1 to 6, further preferably 1 to 3 carbon atoms. Specifically, examples of the group represented by Formula: —COOR include —COOCH$_2$CH$_2$OH, —COOCH$_2$CH(CH$_3$)OH, —COOCH(CH$_3$)CH$_2$OH, —COOH, —COOCH$_3$, and —COOC$_2$H$_5$. In the case where the group represented by Formula: —COOR is —COOH or contains —COOH, —COOH may be a carboxylate such as a carboxylate metal salt and ammonium carboxylate.

Further, the aforementioned carbonyl group-containing group may be a group represented by Formula: —X—COOR, wherein the main chain of X is composed of 2 to 15 atoms, the molecular weight of the atomic group represented by X is preferably 350 or less, and R represents a hydrogen atom, an alkyl group, or a hydroxyalkyl group. The alkyl group and the hydroxyalkyl group preferably have 1 to 16, more preferably 1 to 6, further preferably 1 to 3 carbon atoms.

The aforementioned amide group is preferably a group represented by Formula: —CO—NRR', wherein R and R' each independently represent a hydrogen atom or a substituted or unsubstituted alkyl group, or a bond represented by Formula: —CO—NR"—, wherein R" represents a hydrogen atom, a substituted or unsubstituted alkyl group, or a substituted or unsubstituted phenyl group.

Examples of the aforementioned polar group-containing monomer include hydroxyalkyl (meth)acrylates such as hydroxyethyl acrylate and 2-hydroxypropyl acrylate; alkylidene malonates such as dimethyl methylidene malonate; vinyl carboxyalkyl ethers such as vinyl carboxymethyl ether and vinyl carboxyethyl ether; carboxyalkyl (meth)acrylates such as 2-carboxyethyl acrylate and 2-carboxyethyl methacrylate; (meth)acryloyloxyalkyl dicarboxylic acid esters such as acryloyloxyethyl succinic acid, acryloyloxypropyl succinic acid, methacryloyloxyethyl succinic acid, acryloyloxyethyl phthalic acid, and methacryloyloxyethyl phthalic acid; unsaturated dibasic acid monoesters such as monomethyl maleate ester, monoethyl maleate ester, citraconic acid monomethyl ester, and citraconic acid monoethyl ester; and a monomer (2) represented by Formula (2):

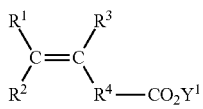

wherein $R^1$ to $R^3$ each independently represent a hydrogen atom or a hydrocarbon group having 1 to 8 carbon atoms, $R^4$ represents a single bond or a hydrocarbon group having 1 to 8 carbon atoms, and $Y^1$ represents an inorganic cation and/or an organic cation.

The fluorine-containing copolymer preferably contains a unit based on the monomer (2) represented by Formula (2) as the aforementioned polar group-containing monomer.

In Formula (2), $Y^1$ represents an inorganic cation and/or an organic cation. Examples of the inorganic cation include cations such as H, Li, Na, K, Mg, Ca, Al, and Fe. Examples of the organic cation include cations such as $NH_4$, $NH_3R^5$, $NH_2R^5{}_2$, $NHR^5{}_3$, $NR^5{}_4$, wherein each $R^5$ independently represents an alkyl group having 1 to 4 carbon atoms. $Y^1$ is preferably H, Li, Na, K, Mg, Ca, Al, or $NH_4$, more preferably H, Li, Na, K, Mg, Al, or $NH_4$, further preferably H, Li, Al, or $NH_4$, particularly preferably H. In the specific examples of the inorganic cation and the organic cation above described, the reference numerals and valences are omitted for convenience of description.

In Formula (2), $R^1$ to $R^3$ each independently represent a hydrogen atom or a hydrocarbon group having 1 to 8 carbon atoms. The hydrocarbon group is a monovalent hydrocarbon group. The hydrocarbon group preferably has 4 or less carbon atoms. Examples of the hydrocarbon group include an alkyl group, an alkenyl group, and an alkynyl group having the aforementioned number of carbon atoms, and a methyl group or an ethyl group are preferable. $R^1$ and $R^2$ preferably each independently represent a hydrogen atom, a methyl group, or an ethyl group, and $R^3$ preferably represents a hydrogen atom or a methyl group.

In Formula (2), $R^4$ represents a single bond or a hydrocarbon group having 1 to 8 carbon atoms. The hydrocarbon group is a divalent hydrocarbon group. The hydrocarbon group preferably has 4 or less carbon atoms. Examples of the hydrocarbon group include an alkylene group and an alkenylene group having the aforementioned number of carbon atoms. Among these, at least one selected from the group consisting of a methylene group, an ethylene group, an ethylidene group, a propylidene group, and an isopropylidene group is preferable, and a methylene group is more preferable.

The monomer (2) is preferably at least one selected from the group consisting of (meth)acrylic acid and a salt thereof, vinyl acetic acid (3-butene acid) and a salt thereof, 3-pentenoic acid and a salt thereof, 4-pentenoic acid and a salt thereof, 3-hexene acid and a salt thereof, 4-heptenoic acid and a salt thereof, and 5-hexene acid and a salt thereof, more preferably at least one selected from the group consisting of 3-butene acid and a salt thereof, and 4-pentenoic acid and a salt thereof.

The content of the polar group-containing monomer unit in the fluorine-containing copolymer is preferably 0.05 to 2.0 mol %, more preferably 0.10 mol % or more, further preferably 0.25 mol % or more, particularly preferably 0.40 mol % or more, and more preferably 1.5 mol % or less, with respect to all monomer units, in view of further suppressing the increase in viscosity of the positive electrode mixture, obtaining further excellent adhesion between the positive electrode mixture layer and the current collector, and forming a positive electrode mixture layer with still higher density.

Herein, the content of the polar group-containing monomer unit in the fluorine-containing copolymer can be measured by acid-base titration of the acid group in the case where the polar group is an acid group such as a carboxylic acid, for example.

Examples of the fluorine-containing copolymer include a VdF/TFE copolymer, a VdF/HFP copolymer, a VdF/TFE/HFP copolymer, a VdF/TFE/2,3,3,3-tetrafluoropropene copolymer, a VdF/TFE/(meth)acrylic acid copolymer, a VdF/HFP/(meth)acrylic acid copolymer, a VdF/CTFE copolymer, a VdF/TFE/4-pentenoic acid copolymer, a VdF/TFE/3-butene acid copolymer, a VdF/TFE/HFP/(meth)acrylic acid copolymer, a VdF/TFE/HFP/4-pentenoic acid copolymer, a VdF/TFE/HFP/3-butene acid copolymer, a VdF/TFE/2-carboxyethyl acrylate copolymer, a VdF/TFE/HFP/2-carboxyethyl acrylate copolymer, a VdF/TFE/acryloyloxyethyl succinic acid copolymer, and a VdF/TFE/HFP/acryloyloxyethyl succinic acid copolymer.

Among these, the fluorine-containing copolymer is preferably a fluorine-containing copolymer consisting only of a VdF unit, a TFE unit, and any non-fluorinated monomer unit, wherein the molar ratio of the VdF unit to the TFE unit (VdF unit/TFE unit) is 57/43 to 90/10. That is, the fluorine-containing copolymer is preferably a binary copolymer consisting only of a VdF unit and a TFE unit, or a ternary or higher copolymer consisting only of a VdF unit, a TFE unit, and a non-fluorinated monomer unit and free from fluorinated monomer units other than the VdF unit and the TFE unit. When the positive electrode mixture layer contains the aforementioned fluorine-containing copolymer, a positive electrode structure can be obtained that includes a positive electrode mixture layer having a still larger thickness and still higher density and also being furthermore difficult to crack even when wound up despite containing a lithium-nickel composite oxide.

In the case where the fluorine-containing copolymer contains a VdF unit and a TFE unit, the molar ratio of the VdF unit to the TFE unit (VdF unit/TFE unit) is preferably 57/43 to 90/10, more preferably 60/40 to 89/11, further preferably 63/37 to 88/12, particularly preferably 63/37 to 85/15.

The fluorine-containing copolymer has a weight-average molecular weight (in terms of polystyrene) of preferably 161,000 to 2,760,000, more preferably 322,000 to 2,530,000, further preferably 600,000 to 2,000,000. The weight-average molecular weight can be measured at 50° C. by gel permeation chromatography (GPC) using dimethylformamide as a solvent.

The fluorine-containing copolymer has a number-average molecular weight (in terms of polystyrene) of preferably 70,000 to 1,200,000, more preferably 140,000 to 1,100,000. The number-average molecular weight can be measured at 50° C. by gel permeation chromatography (GPC) using dimethylformamide as a solvent.

The fluorine-containing copolymer has a melting point of preferably 100 to 170° C., more preferably 110 to 165° C., further preferably 120 to 163° C. The melting point is determined using a differential scanning calorimetry (DSC) device and is a temperature corresponding to the maximum value in the heat-of-fusion curve when the temperature is raised from 30° C. to 220° C. at a rate of 10° C./minute, thereafter lowered to 30° C. at a rate of 10° C./minute, and raised again to 220° C. at a rate of 10° C./minute.

The fluorine-containing copolymer preferably has an elongation at break of 100% or more. When the elongation at break is 100% or more, the flexibility of the positive electrode structure is further improved, so that cracking of the electrode can be suppressed. The elongation at break is more preferably 200% or more, further preferably 300% or more.

The elongation at break can be measured by the following method. A fluorine-containing copolymer solution obtained by dissolving the fluorine-containing copolymer in N-methyl-2-pyrrolidone (NMP) to a concentration of 10 to 20 mass % is casted onto a glass plate, dried at 100° C. for 12 hours, and further dried at 100° C. under vacuum for 12 hours, to obtain a film with a thickness of 50 to 100 μm. The film is punched into a dumbbell shape, and the elongation at break at 25° C. is measured by an autograph.

The fluorine-containing copolymer preferably has a storage modulus at 30° C. of 1,100 MPa or less and a storage modulus at 60° C. of 500 MPa or less. When the storage modulus at 30° C. and that at 60° C. of the fluorine-containing copolymer are 1,100 MPa or less, and 500 MPa or less, respectively, the flexibility of the positive electrode structure is further improved, so that cracking of the electrode can be suppressed.

The storage modulus at 30° C. of the fluorine-containing copolymer is more preferably 800 MPa or less, further preferably 600 MPa or less.

The storage modulus at 60° C. of the fluorine-containing copolymer is more preferably 350 MPa or less.

The storage modulus at 30° C. of the fluorine-containing copolymer is preferably 100 MPa or more, more preferably 150 MPa or more, further preferably 200 MPa or more.

The storage modulus at 60° C. of the fluorine-containing copolymer is preferably 50 MPa or more, more preferably 80 MPa or more, further preferably 130 MPa or more.

The storage modulus is a value measured at 30° C. and 60° C. for a sample with a length of 30 mm, a width of 5 mm, and a thickness of 50 to 100 μm by dynamic viscoelasticity using a dynamic viscoelasticity analyzer DVA220, available from IT Measurement Control Co., Ltd., under conditions of a tensile mode, a grip width of 20 mm, a measurement temperature ranging from −30° C. to 160° C., a temperature-increasing rate of 2° C./min, and a frequency of 1 Hz.

The measurement sample can be produced, for example, by dissolving the fluorine-containing copolymer in N-methyl-2-pyrrolidone (NMP) to a concentration of 10 to 20 mass % to give a fluorine-containing copolymer solution, casting the solution onto a glass plate, followed by drying at 100° C. for 12 hours and further drying at 100° C. for 12 hours under vacuum, to form a film with a thickness of 50 to 100 μm, and cutting the film to a length of 30 mm and a width of 5 mm.

The fluorine-containing copolymer has a rate of weight increase after immersion in an electrolyte at 60° C. for one week of preferably 250 mass % or less, more preferably 200 mass % or less. The lower the rate of weight increase after immersion in an electrolyte at 60° C. for one week, the more difficult it is for the fluorine-containing copolymer to swell in an electrolyte at a high temperature, so that high peel strength between the current collector and the positive electrode mixture layer can be maintained even at a high temperature. When the rate of weight increase after immersion in an electrolyte at 60° C. for one week is excessively high, it may not be possible to maintain high peel strength between the current collector and the positive electrode mixture layer, which may increase the resistance characteristics of the battery or may significantly decrease the charge/discharge cycle characteristics at a high temperature.

The rate of weight increase after immersion in an electrolyte at 60° C. for one week of the fluorine-containing copolymer is further preferably 180 mass % or less, particularly preferably 160 mass % or less, and may be 105 mass % or more.

The aforementioned rate of weight increase can be determined by the following method.

The NMP solution (8 mass %) of the fluorine-containing copolymer is casted into a glass petridish, followed by vacuum drying at 100° C. for 12 hours, to produce a fluorine-containing copolymer film with a thickness of 200 μm. The film obtained is punched into a diameter of 6 mm and put into an electrolyte (a solution obtained by dissolving $LiPF_6$ in a solvent of ethylene carbonate/ethyl methyl carbonate at 3/7 (volume ratio) to a concentration of 1 M) contained in a sample bottle, and the rate of weight increase is determined after the film is left standing at 60° C. for one week.

The positive electrode mixture layer of the positive electrode structure of the present disclosure preferably further contains polyvinylidene fluoride (PVdF) since furthermore excellent adhesion between the positive electrode mixture layer and the positive electrode current collector is obtained.

Polyvinylidene fluoride (PVdF) is a polymer containing a unit based on vinylidene fluoride (VdF) (which will be hereinafter referred to as VdF unit), and the polymer may be a VdF homopolymer consisting only of a VdF unit or a polymer containing a VdF unit and a unit based on a monomer copolymerizable with VdF.

In the PVdF, the monomer copolymerizable with VdF is preferably a monomer different from tetrafluoroethylene (TFE). That is, the PVdF is preferably free from TFE units.

In the PVdF, examples of the monomer copolymerizable with the VdF include fluorinated monomers and non-fluorinated monomers, and fluorinated monomers are preferable. Examples of the fluorinated monomers include vinyl fluoride, trifluoroethylene, chlorotrifluoroethylene (CTFE), fluoroalkyl vinyl ether, hexafluoropropylene (HFP), (perfluoroalkyl) ethylene, 2,3,3,3-tetrafluoropropene, and trans-1,3,3,3-tetrafluoropropene. Examples of the non-fluorinated monomers include ethylene and propylene.

In the PVdF, the monomer copolymerizable with VdF is preferably at least one fluorinated monomer selected from the group consisting of CTFE, fluoroalkyl vinyl ether, HFP, and 2,3,3,3-tetrafluoropropene, more preferably at least one fluorinated monomer selected from the group consisting of CTFE, HFP and fluoroalkyl vinyl ether.

In the PVdF, the content of the monomer unit copolymerizable with VdF is preferably 0.10 to 8.0 mol %, more preferably 0.50 mol % or more, and less than 5.0 mol %, with respect to all monomer units. Further, the content of the fluorinated monomer unit is preferably 0.10 to 8.0 mol %, more preferably 0.50 mol % or more, and less than 5.0 mol %, with respect to all monomer units.

Herein, the compositional features of the PVdF can be measured, for example, by $^{19}$F-NMR measurement.

The PVdF may have a polar group, whereby furthermore excellent adhesion between the positive electrode mixture layer and the current collector is obtained. The polar group is not limited, as long as it is a functional group having a polarity but is preferably at least one selected from the group consisting of a carbonyl group-containing group, an epoxy group, a hydroxy group, a sulfonate group, a sulfate group, a phosphate group, an amino group, an amide group, and an alkoxy group, more preferably at least one selected from the group consisting of a carbonyl group-containing group, an epoxy group, and a hydroxy group, further preferably a carbonyl group-containing group, in view of obtaining further excellent adhesion between the positive electrode mixture layer and the current collector. The aforementioned hydroxy group does not include the hydroxy group as a part of the aforementioned carbonyl group-containing group. Further, the aforementioned amino group is a monovalent functional group obtained by removing hydrogen from ammonia or primary or secondary amine.

The aforementioned carbonyl group-containing group is a functional group having a carbonyl group (—C(=O)—). The aforementioned carbonyl group-containing group is preferably a carboxylic acid anhydride group or a group represented by Formula: —COOR, wherein R represents a hydrogen atom, an alkyl group, or a hydroxyalkyl group, more preferably a group represented by Formula: —COOR, in view of obtaining further excellent adhesion between the positive electrode mixture layer and the current collector. The alkyl group and the hydroxyalkyl group preferably have 1 to 16, more preferably 1 to 6, further preferably 1 to 3 carbon atoms. Specifically, examples of the group represented by Formula: —COOR include —COOCH$_2$CH$_2$OH, —COOCH$_2$CH(CH$_3$)OH, —COOCH(CH$_3$)CH$_2$OH, —COOH, —COOCH$_3$, and —COOC$_2$H$_5$. In the case where the group represented by Formula: —COOR is —COOH or contains —COOH, —COOH may be a carboxylate such as a carboxylate metal salt and ammonium carboxylate.

Further, the aforementioned carbonyl group-containing group may be a group represented by Formula: —X—COOR, wherein the main chain of X is composed of 2 to 15 atoms, the molecular weight of the atomic group represented by X is preferably 350 or less, and R represents a hydrogen atom, an alkyl group, or a hydroxyalkyl group. The alkyl group and the hydroxyalkyl group preferably have 1 to 16, more preferably 1 to 6, further preferably 1 to 3 carbon atoms.

The aforementioned amide group is preferably a group represented by Formula: —CO—NRR', wherein R and R' each independently represent a hydrogen atom or a substituted or unsubstituted alkyl group, or a bond represented by Formula: —CO—NR"—, wherein R" represents a hydrogen atom, a substituted or unsubstituted alkyl group, or a substituted or unsubstituted phenyl group.

The aforementioned polar group can be introduced into PVdF either by polymerizing VdF with a monomer having the aforementioned polar group (which will be hereinafter referred to as polar group-containing monomer) or reacting PVdF with a compound having the aforementioned polar group, but it is preferable to polymerize VdF with the aforementioned polar group-containing monomer, in view of productivity.

When VdF is polymerized with the aforementioned polar group-containing monomer, PVdF containing a VdF unit and a polar group-containing monomer unit is obtained. That is, the PVdF preferably contains the aforementioned polar group-containing monomer unit, since further excellent adhesion between the positive electrode mixture layer and the current collector is obtained. The content of the polar group-containing monomer unit is preferably 0.001 to 8.0 mol %, more preferably 0.01 to 5.0 mol %, further preferably 0.30 to 3.0 mol %, with respect to all monomer units.

In the present disclosure, the content of the polar group-containing monomer unit in the PVdF can be measured, in the case where the polar group is an acid group such as a carboxylic acid, for example, by acid-base titration of the acid group.

Examples of the aforementioned polar group-containing monomer include hydroxyalkyl (meth)acrylates such as hydroxyethyl acrylate and 2-hydroxypropyl acrylate; unsaturated monobasic acids such as (meth)acrylic acid, crotonic acid, vinyl acetic acid (3-butene acid), 3-pentenoic acid, 4-pentenoic acid, 3-hexene acid, and 4-heptenoic acid; unsaturated dibasic acids such as maleic acid, maleic anhydride, citraconic acid, and citraconic anhydride; alkylidene malonates such as dimethyl methylidene malonate; vinyl carboxyalkyl ethers such as vinyl carboxymethyl ether and vinyl carboxyethyl ether; carboxyalkyl (meth)acrylates such as 2-carboxyethyl acrylate and 2-carboxyethyl methacrylate; (meth) acryloyloxyalkyl dicarboxylic acid esters such as acryloyloxyethyl succinic acid, methacryloyloxyethyl succinic acid, acryloyloxyethyl phthalic acid, acryloyloxypropyl succinic acid, and methacryloyloxyethyl phthalic acid; and unsaturated dibasic acid monoesters such as monomethyl maleate ester, monoethyl maleate ester, citraconic acid monomethyl ester, and citraconic acid monoethyl ester.

In the case of introducing the aforementioned polar group into PVdF by reacting PVdF with a compound having the aforementioned polar group, the compound having the aforementioned polar group to be used can be the aforementioned polar group-containing monomer, or a silane coupling agent or a titanate coupling agent having a group that is reactive with PVdF and a hydrolyzable group. The hydrolyzable group is preferably an alkoxy group. In the case of using a coupling agent, the coupling agent can be added to PVdF by reaction with PVdF that is swelled or dissolved in a solvent.

The PVdF to be used also can be a material obtained by partially dehydrofluorinating PVdF with a base and further reacting the partially dehydrofluorinated PVdF with an oxidant. Examples of the aforementioned oxidant include hydrogen peroxide, hypochlorite, palladium halide, chromium halide, alkali metal permanganate, peracid compound, alkyl peroxide, and alkyl persulfate.

The content of the VdF unit in the PVdF is preferably 84.0 to 99.999 mol %, more preferably 90.0 mol % or more, further preferably 92.0 mol % or more, particularly preferably over 95.0 mol %, most preferably 97.0 mol % or more, with respect to all monomer units, in view of obtaining further excellent adhesion between the positive electrode mixture layer and the current collector. The upper limit is preferably 99.99 mol % or less, 99.90 mol % or less, 99.899 mol % or less, 99.70 mol % or less, 99.50 mol % or less, 99.49 mol % or less, 99.20 mol % or less, sequentially.

The PVdF has a weight-average molecular weight (in terms of polystyrene) of preferably 161,000 to 2,760,000, more preferably 322,000 or more, further preferably 600,000 or more, more preferably 2,530,000 or less, further preferably 2,000,000 or less. The weight-average molecular weight can be measured at 50° C. by gel permeation chromatography (GPC) using dimethylformamide as a solvent.

The PVdF has a number-average molecular weight (in terms of polystyrene) of preferably 70,000 to 1,200,000, more preferably 140,000 or more, more preferably 1,100,000 or less. The number-average molecular weight can be measured at 50° C. by gel permeation chromatography (GPC) using dimethylformamide as a solvent.

The PVdF has a melting point of preferably 100 to 240° C. The melting point can be determined using a differential scanning calorimetry (DSC) device and is a temperature corresponding to the maximum value in the heat-of-fusion curve when the temperature is raised at a rate of 10° C./minute.

The PVdF can be produced, for example, by a conventionally known method including appropriately mixing VdF, the aforementioned polar group-containing monomer, and an additive such as a polymerization initiator, and performing solution polymerization or suspension polymerization.

The PVdF has a storage modulus at 30° C. of preferably 2,000 MPa or less, more preferably 1,800 MPa or less.

The PVdF has a storage modulus at 60° C. of preferably 1,500 MPa or less, more preferably 1,300 MPa or less.

The PVdF has a storage modulus at 30° C. of preferably 1,000 MPa or more, more preferably 1,100 MPa or more.

The PVdF has a storage modulus at 60° C. of preferably 600 MPa or more, more preferably 700 MPa or more.

When the storage modulus at 30° C. or 60° C. falls within such a range, the flexibility of the positive electrode structure is further improved, so that cracking of the electrode can be suppressed.

The storage modulus of the PVdF can be measured by the same method as for the storage modulus of the fluorine-containing copolymer.

The mass ratio of the PVdF to the fluorine-containing copolymer (PVdF/fluorine-containing copolymer) in the positive electrode mixture layer is preferably 99/1 to 1/99, more preferably 97/3 to 3/97, further preferably 95/5 to 5/95, particularly preferably 90/10 to 10/90, most preferably 85/15 to 15/85, in view of allowing the positive electrode mixture to have excellent dispersibility, and forming a positive electrode mixture layer with still higher density.

The positive electrode mixture layer may contain a polymer other than the PVdF or the fluorine-containing copolymer as a binder. Examples of the other polymer include polymethacrylate, polymethylmethacrylate, polyacrylonitrile, polyimide, polyamide, polyamide imide, polycarbonate, styrene rubber, and butadiene rubber.

The content of the fluorine-containing copolymer in the binder is preferably 1 mass % or more, more preferably 3 mass % or more, further preferably 5 mass % or more, particularly preferably 10 mass % or more, most preferably 15 mass % or more, and may be 100 mass % or less, with respect to the mass of the binder, in view of obtaining a positive electrode structure that has still larger thickness and still higher density and is more difficult to crack when wound up.

The content of the binder in the positive electrode mixture layer is preferably as small as possible, for further increasing the capacity, and is preferably 0.3 to 3.0 mass %, more preferably 0.3 to 2.0 mass %, further preferably 0.3 to 1.5 mass %, and may be 1.0% mass or less, with respect to the mass of the positive electrode mixture layer. In the conventional art, when the content of the binder is as low as described above, the positive electrode mixture layer and the positive electrode current collector may not sufficiently adhere to each other, or the positive electrode mixture layer may have poor flexibility and easily crack. However, it has been found that use of the aforementioned fluorine-containing copolymer as a binder can solve such a problem. Use of the aforementioned fluorine-containing copolymer as a binder enables a positive electrode mixture layer that is difficult to crack when wound up to be formed, even if the content of the binder in the positive electrode mixture layer is low.

Conductive Additive

The positive electrode mixture layer of the positive electrode structure of the present disclosure preferably further contains a conductive additive. Examples of the aforementioned conductive additive include carbon blacks such as acetylene black and Ketjenblack, carbon materials such as graphite and graphene, carbon fibers, single-walled carbon nanotubes, multilayer carbon nanotubes, and carbon nanohorns. The positive electrode mixture layer of the positive electrode structure of the present disclosure preferably contains at least one conductive additive. Among these, the conductive additive is preferably a single-walled carbon nanotube or a multilayer carbon nanotube, in view of obtaining further excellent adhesion between the positive electrode mixture layer and the current collector, and further enhancing the capacity of the secondary battery and further reducing the resistance thereof even if the content in the positive electrode mixture layer is low. As the conductive additive, a single-walled carbon nanotube and a multilayer carbon nanotube may be used in combination, or a single-walled carbon nanotube or a multilayer carbon nanotube and another conductive additive may be used in combination.

In the case of using only a carbon black such as acetylene black and Ketjenblack as the conductive additive, the content of the conductive additive in the positive electrode mixture layer is preferably 0.5 to 3.0 mass %, with respect to the mass of the positive electrode mixture layer.

Further, in the case of using a carbon black and a carbon nanotube such as a single-walled carbon nanotube and a multilayer carbon nanotube in combination as the conductive additive, the content of the conductive additive in the positive electrode mixture layer is preferably 0.1 to 2.0 mass %, with respect to the mass of the positive electrode mixture layer. Thus, use of a carbon black and a carbon nanotube in combination can reduce the content of the conductive additive. Use of these in combination can sufficiently bring about excellent performance of the conductive additive, even if the content of the conductive additive is less than 0.5 mass %.

In the positive electrode mixture layer, the ratio of the content of the binder to the content of the conductive additive is preferably 5/95 to 95/5 by mass.

Current Collector

The positive electrode structure of the present disclosure comprises a current collector. Examples of the current collector of the positive electrode structure of the present disclosure include metal foils or metal meshes of iron, stainless steel, copper, aluminum, nickel, titanium, and the like. Among these, an aluminum foil is preferable.

Method for Producing Positive Electrode Structure

The positive electrode structure of the present disclosure can be suitably produced by a production method comprising: preparing a positive electrode mixture containing at least a positive electrode active material, a binder, and an organic solvent; and applying the positive electrode mixture obtained to a current collector.

The positive electrode mixture preferably further contains the aforementioned conductive additive in addition to the aforementioned positive electrode active material and the binder. In this case, examples of the method for preparing the positive electrode mixture above include a method including dispersing or mixing a positive electrode active material and a conductive additive, as required, into a solution obtained by dissolving a binder in an organic solvent. Further, the positive electrode mixture may be prepared by a method including first mixing a binder and a positive electrode active material, and adding thereto an organic solvent and a conductive additive, as required, or a method of adding and mixing a conductive additive or the like, as required, to a solution obtained by dissolving a binder in an organic solvent, and further adding and mixing a positive electrode active material thereto.

The amount applied of the positive electrode mixture containing at least the positive electrode active material, the binder, and the organic solvent to the current collector is preferably 22.0 mg/cm$^2$ or more, more preferably 24.0 mg/cm$^2$ or more, further preferably 25.0 mg/cm$^2$ or more, in view of forming a thick positive electrode mixture layer, and further enhancing the capacity of the lithium ion secondary battery. Further, the amount is preferably 60.0 mg/cm$^2$ or less, more preferably 50.0 mg/cm$^2$ or less, for suppressing cracking of the positive electrode mixture layer. The amount of the positive electrode mixture applied is expressed in terms of a dry weight of the positive electrode mixture per unit area.

Examples of the organic solvent contained in the positive electrode mixture include nitrogen-containing organic solvents such as N-methyl-2-pyrrolidone, N, N-dimethylacetamide, and dimethylformamide; ketone solvents such as acetone, methyl ethyl ketone, cyclohexanone, and methyl isobutyl ketone; ester solvents such as ethyl acetate and butyl acetate; ether solvents such as tetrahydrofuran and dioxane; and general-purpose organic solvents with a low boiling point such as mixed solvents thereof. Among these, the organic solvent is preferably N-methyl-2-pyrrolidone and/or N, N-dimethylacetamide, in view of the excellent coating property.

The contents of the positive electrode active material, the binder, and the organic solvent in the positive electrode mixture are determined in consideration of the coating property to the current collector, formation of a thin film after drying, or the like. The total content of the binder and the positive electrode active material in the positive electrode mixture is preferably 50 to 90 mass %, more preferably 60 to 80 mass %, further preferably 65 to 75 mass %.

Further, the binder to be used desirably has a small-particle diameter, specifically an average particle diameter of 1,000 μm or less, particularly 50 to 350 μm, for enabling rapid dissolution in the aforementioned organic solvent.

The viscosity of the positive electrode mixture is preferably 1,000 to 80,000 mPa·s, more preferably 2,000 to 70,000 mPa·s, further preferably 3,000 to 60,000 mPa·s, for easy application and easy formation of the positive electrode mixture layer with a desired thickness. The viscosity can be measured by a B-type viscometer at 25° C.

In the aforementioned production method, it is preferable to apply the positive electrode mixture to the current collector, then drying the coating film to remove the organic solvent, and pressing the dry coating film obtained to form a positive electrode mixture layer. Even if the dry coating film is pressed at high pressure, use of the aforementioned binder makes the positive electrode mixture layer difficult to crack, and a thick and high-density positive electrode mixture layer can thus be obtained.

Secondary Battery

Further, the present disclosure provides a secondary battery comprising the positive electrode structure. The secondary battery of the present disclosure preferably further comprises a negative electrode structure and a non-aqueous electrolyte, in addition to the positive electrode structure.

The non-aqueous electrolyte is not limited, and one or more of known solvents such as propylene carbonate, ethylene carbonate, butylene carbonate, γ-butyl lactone, 1,2-dimethoxyethane, 1,2-diethoxyethane, dimethyl carbonate, diethyl carbonate, and ethyl methyl carbonate can be used. The electrolyte to be used can be any one of conventionally known electrolytes and can be $LiClO_4$, $LiAsF_6$, $LiPF_6$, $LiBF_4$, $LiCl$, $LiBr$, $CH_3SO_3Li$, $CF_3SO_3Li$, cesium carbonate, or the like.

The positive electrode structure of the present disclosure comprises a thick and high-density positive electrode mixture layer, and the positive electrode mixture layer is difficult to crack even when wound up. Accordingly, the positive electrode structure of the present disclosure can be suitably used as a positive electrode structure for wound-type secondary batteries. Further, the secondary battery of the present disclosure may be a wound-type secondary battery.

In the case where the positive electrode mixture layer of the positive electrode structure of the present disclosure contains a fluorine-containing copolymer having a storage modulus within the aforementioned range, the positive electrode structure has still better flexibility. The good flexibility of the positive electrode structure of the present disclosure can be confirmed, for example, by the fact that the maximum stress in a bending test using a three-point bending test jig is lower than that in a positive electrode structure that contains a positive electrode mixture layer containing no fluorine-containing copolymer. Thus, the flexibility of the positive electrode structure that is confirmed in the three-point bending test correlates to the storage modulus of the fluorine-containing copolymer.

The three-point bending test of the positive electrode structure can be conducted, for example, by applying a three-point bending test jig, available from SHIMADZU CORPORATION or IMADA CO., LTD., cutting the positive electrode structure of the present disclosure into a length of 1.5 cm and a width of 2 cm, setting the width between the two fulcrums of the jig to 1 cm, and measuring the strain and stress when the center of the positive electrode structure is pressed down at a jig pressing rate from the upper center position of 2 mm/min. This measurement method is a method using the maximum point of stress as a measure of the flexibility of the electrode.

In the measurement, the maximum stress in the three-point bending test for the positive electrode structure of the present disclosure is lower, for example, by 20 to 50% than the maximum stress of a positive electrode structure having a positive electrode mixture layer that does not contain a fluorine-containing copolymer. Such a lower stress indicates that the fluorine-containing copolymer has an appropriate storage modulus.

The positive electrode structure of the present disclosure is useful for non-aqueous electrolyte secondary batteries, specifically, not only for a lithium ion secondary battery including a liquid electrolyte as described above, but also for a lithium secondary battery including a polymer electrolyte. Further, it is useful also for electric double layer capacitors.

Although the embodiments have been described above, it will be understood that various changes in form and details can be made without departing from the spirit and scope of the claims.

EXAMPLES

Next, the embodiments of the present disclosure will be described with reference to examples, but the present disclosure is not limited to the examples.

The numerical values in Examples were measured by the following methods.

<Compositional Features of PVdF>
Content of Polar Group-Containing Monomer Unit

The content of the polar group-containing monomer unit (such as an acrylic acid unit, a maleic acid unit, an acrylic acid unit, and a 3-butene acid unit) in the PVdF was measured by an acid-base titration of carboxylic acid groups. Specifically, about 0.5 g of PVdF was dissolved in acetone at a temperature of 70 to 80° C. 5 ml of water was added dropwise under vigorous stirring so as to avoid solidification of the PVdF. In the neutral transition at about −270 mV, titration with an aqueous NaOH solution having a concentration of 0.1 N was performed until complete neutralization of acidity. From the measurement results, the amount of substance of the polar group-containing monomer unit contained in 1 g of the PVdF was determined, and the content of the polar group-containing monomer unit was calculated therefrom.

Contents of CTFE Unit and HFP Unit

The contents of the CTFE unit and the HFP unit in the PVdF were determined by a method such as quantification of the content of chlorine in the PVdF and $^{19}$F-NMR measurement using an NMR spectrometer (VNS400 MHz, available from Agilent Technologies, Inc).

<Compositional Features of Fluorine-Containing Copolymer>
Ratio of VdF Unit to TFE Unit The ratio of the VdF unit to the TFE unit was measured in the state of a polymer solution in DMF-$d_7$ by $^{19}$F-NMR measurement using an NMR spectrometer (VNS400 MHz, available from Agilent Technologies, Inc).

In the $^{19}$F-NMR measurement, the following peak areas (A, B, C, and D) were determined, and the ratio of the VdF unit to the TFE unit was calculated therefrom.

A: Peak area at −86 ppm to −98 ppm
B: Peak area at −105 ppm to −118 ppm
C: Peak area at −119 ppm to −122 ppm
D: Peak area at −122 ppm to −126 ppm
Proportion of VdF unit: (4A+2B)/(4A+3B+2C+2D)×100 [mol %]
Proportion of TFE unit: (B+2C+2D)/(4A+3B+2C+2D)×100 [mol %]

Ratio of VdF Unit to HFP Unit

The ratio of the VdF unit to the HFP unit was measured in the state of a polymer solution in DMF-$d_7$ by $^{19}$F-NMR measurement using an NMR spectrometer (VNS400 MHz, available from Agilent Technologies, Inc).

Content of Polar Group-Containing Monomer Unit

The content of the polar group-containing monomer unit (such as a 4-pentenoic acid unit, a 3-butene acid unit, and an acrylic acid unit) in the fluorine-containing copolymer was measured by titration of acid of carboxy groups with a base. About 0.5 g of the fluorine-containing copolymer was dissolved in acetone at a temperature of 70 to 80° C. 5 ml of water was added so that the fluorine-containing copolymer did not solidify. In the neutral transition at about −270 mV, titration with an aqueous NaOH solution having a concentration of 0.1 N was performed until complete neutralization of acidity. From the measurement results, the amount of substance of the polar group-containing monomer unit contained in 1 g of the fluorine-containing copolymer was determined, and the content of the polar group-containing monomer unit was calculated therefrom.

<Weight-Average Molecular Weight>

The weight-average molecular weight was measured by gel permeation chromatography (GPC). The weight-average molecular weight was calculated based on the data (reference: polystyrene) measured under circulating dimethylformamide (DMF) as a solvent at a flow rate of 1.0 ml/minute, using AS-8010, CO-8020, columns (three columns, GMHHR-H, connected in series), available from Tosoh Corporation, and RID-10A, available from SHIMADZU CORPORATION.

<Storage Modulus (E')>

The storage modulus is a value measured at 30° C. or 60° C. by dynamic viscoelasticity and was measured using a dynamic viscoelasticity analyzer, DVA220, available from IT Measurement Control Co., Ltd., for a test specimen with a length of 30 mm, a width of 5 mm, a thickness of 50 to 100 μm under conditions of a tensile mode, a grip width of 20 mm, a measurement temperature ranging from −30° C. to 160° C., a temperature-increasing rate of 2° C./min, and a frequency of 1 Hz.

The test specimen used for measurement was produced by dissolving the PVdF and the fluorine-containing copolymer in N-methyl-2-pyrrolidone (NMP) to a concentration of 10 to 20 mass % to give a fluorine-containing copolymer solution, casting the solution onto a glass plate, followed by drying at 100° C. for 12 hours and further drying at 100° C. for 12 hours under vacuum, to form a film with a thickness of 50 to 100 μm, and cutting the film to a length of 30 mm and a width of 5 mm.

<Melting Point>

The melting point was determined using a differential scanning calorimetry (DSC) device and was a temperature corresponding to the maximum value in the heat-of-fusion curve when the temperature is raised from 30° C. to 220° C. at a rate of 10° C./minute, thereafter lowered to 30° C. at a rate of 10° C./minute, and raised again to 220° C. at a rate of 10° C./minute.

<Thickness of Positive Electrode Mixture Layer on One Side>

A test specimen was produced by preparing a positive electrode structure by pressing with a roll press machine and punching it using a hand punch with a diameter of 13 mm, and the total thickness of the test specimen was measured with a micrometer gauge with a minimum scale of 1 μm. A value obtained by subtracting the thickness of the positive electrode current collector from the found value was defined as the thickness of the positive electrode mixture layer on one side. In the case of a both-side-coated electrode, a value obtained by dividing the calculated value by 2 was taken as the thickness of the positive electrode mixture layer on one side.

<Density of Positive Electrode Mixture Layer>

A test specimen was produced by preparing a positive electrode structure by pressing with a roll press machine and punching it using a hand punch with a diameter of 13 mm, and the mass and area of the test specimen were measured. Then, the density of the positive electrode mixture layer was calculated from the masses of the test specimen and the positive electrode current collector, the area of the test specimen, and the thickness of the positive electrode mixture layer determined by the aforementioned method.

<Adhesion Between Positive Electrode Mixture Layer and Current Collector>

A test specimen of 1.2 cm×7.0 cm was produced by cutting a one-side coated positive electrode structure obtained by pressing with a roll press machine. After the electrode side of the test specimen was fixed to a movable jig with a double-sided adhesive tape, a tape was attached to a surface of the positive electrode current collector, and the stress (N/cm) when the tape was drawn at 90 degrees at a rate of 100 mm/minute was measured using an autograph. The load cell of the autograph used was 1 N.

<Flexibility of Positive Electrode>

A test specimen of 2 cm×10 cm was produced by cutting a both-side-coated positive electrode structure obtained by pressing with a roll press machine, and the test specimen was wound around a round bar with a diameter of 5 mm, 3 mm, 2.5 mm, 2.0 mm, or 1.0 mm. The positive electrode mixture layer was visually observed and evaluated according to the following criteria.

○: No cracks were observed.

Δ: Some cracks were observed, but no breakage of the positive electrode mixture layer or the current collector foil was observed.

x: The positive electrode mixture layer and the current collector foil were broken.

<Production of Wound Laminated Battery>

The positive electrode structure produced in each of Examples was cut into 500 mm×700 mm (with a positive electrode terminal), a strip-shaped negative electrode was cut into 502 mm×702 mm (with a negative electrode terminal), and a lead was welded to each terminal. Further, a polypropylene film separator with a thickness of 20 μm was cut into a size of 504 mm×800 mm, and the positive electrode and the negative electrode were wound with the separator interposed. The resultant was put into a packaging material. Then, 5 g of an electrolyte (obtained by dissolving $LiPF_6$ in a solvent obtained by mixing ethylene carbonate and ethyl methyl carbonate at a volume ratio of 3/7 to a concentration of 1 mol/liter) was put into the packaging material, and the resultant packaging material was sealed to produce a wound-type battery.

<Initial Discharge Capacity of Battery>

The wound-type battery produced above was charged to SOC 80% at a constant current of 0.2 C in an environment at a temperature of 25° C. After the completion, the battery was aged in an environment at a temperature of 60° C. for 12 hours and then degassed. In an environment at a temperature of 25° C., the battery was charged again in a constant current/constant voltage mode of 0.2 C and 4.2 V and then discharged to a voltage of 3.0 V at a constant current of 0.2 C. For the second and subsequent cycles, charging in a constant current/constant voltage mode of 0.2 C and 4.2 V and then discharging to a voltage of 3.0 V at a constant current of 0.2 C were repeated in an environment at a temperature of 25° C., and the discharge capacity at the third cycle was defined as the initial discharge capacity (mAh).

In Examples and Comparative Examples, polymers having the following physical properties were used.

<PVdF>

A: VdF homopolymer
Weight-average molecular weight: 900,000
Storage modulus at 30° C.: 1,740 MPa
Storage modulus at 60° C.: 1,140 MPa
Melting point: 171° C.

B: VdF homopolymer
Weight-average molecular weight: 1,800,000
Storage modulus at 30° C.: 1,820 MPa
Storage modulus at 60° C.: 1,180 MPa
Melting point: 171° C.

C: PVdF containing acrylic acid unit
Content of acrylic acid unit: 1.0 mol %
Weight-average molecular weight: 1,100,000
Storage modulus at 30° C.: 1,280 MPa
Storage modulus at 60° C.: 720 MPa
Melting point: 161° C.

D: PVdF containing maleic acid unit
Content of maleic acid unit: 0.5 mol %
Weight-average molecular weight: 900,000
Storage modulus at 30° C.: 1,260 MPa
Storage modulus at 60° C.: 760 MPa
Melting point: 167° C.

E: PVdF containing CTFE unit
Content of CTFE unit: 2.4 mol %
Weight-average molecular weight: 800,000
Storage modulus at 30° C.: 1,250 MPa
Storage modulus at 60° C.: 880 MPa
Melting point: 168° C.

F: PVdF containing HFP unit and acrylic acid unit
VdF/HFP=97.5/2.5 (mol %)
Content of acrylic acid unit: 1.0 mol %
Weight-average molecular weight: 1,110,000
Storage modulus at 30° C.: 1,080 MPa
Storage modulus at 60° C.: 750 MPa
Melting point: 150° C.

G: PVdF containing 3-butene acid unit
Content of 3-butene acid unit: 1.0 mol %
Weight-average molecular weight: 1,000,000
Storage modulus at 30° C.: 1,230 MPa
Storage modulus at 60° C.: 730 MPa
Melting point: 163° C.

<Fluorine-Containing Copolymer> a: Fluorine-containing copolymer containing VdF unit and TFE unit
VdF/TFE=83/17 (mol %)
Weight-average molecular weight: 1,230,000
Storage modulus at 30° C.: 490 MPa
Storage modulus at 60° C.: 260 MPa
Melting point: 131° C.

b: Fluorine-containing copolymer containing VdF unit and TFE unit
VdF/TFE=63/37 (mol %)
Weight-average molecular weight: 1,130,000
Storage modulus at 30° C.: 440 MPa
Storage modulus at 60° C.: 180 MPa
Melting point: 160° C.

c: Fluorine-containing copolymer containing VdF unit, TFE unit, and 4-pentenoic acid unit
VdF/TFE=82/18 (mol %)
Content of 4-pentenoic acid: 0.5 mol %
Weight-average molecular weight: 820,000
Storage modulus at 30° C.: 363 MPa
Storage modulus at 60° C.: 165 MPa
Melting point: 123° C.

d: Fluorine-containing copolymer containing VdF unit, TFE unit, and 4-pentenoic acid unit
VdF/TFE=68/32 (mol %)
Content of 4-pentenoic acid: 0.7 mol %
Weight-average molecular weight: 930,000
Storage modulus at 30° C.: 385 MPa
Storage modulus at 60° C.: 129 MPa
Melting point: 135° C.
e: Fluorine-containing copolymer containing VdF unit, TFE unit, and 3-butene acid unit
VdF/TFE=87/13 (mol %)
Content of 3-butene acid: 0.5 mol %
Weight-average molecular weight: 810,000
Storage modulus at 30° C.: 690 MPa
Storage modulus at 60° C.: 390 MPa
Melting point: 134° C.
f: Fluorine-containing copolymer containing VdF unit and TFE unit
VdF/TFE=83/17 (mol %)
Weight-average molecular weight: 1,810,000
Storage modulus at 30° C.: 510 MPa
Storage modulus at 60° C.: 275 MPa
Melting point: 131° C.
g: Fluorine-containing copolymer containing VdF unit, TFE unit, and 4-pentenoic acid unit
VdF/TFE=78/22 (mol %)
Content of 4-pentenoic acid: 0.2 mol %
Weight-average molecular weight: 1,700,000
Storage modulus at 30° C.: 490 MPa
Storage modulus at 60° C.: 260 MPa
Melting point: 122° C.
h: Fluorine-containing copolymer containing VdF unit and HFP unit
VdF/HFP=95/5 (mol %)
Weight-average molecular weight: 700,000
Storage modulus at 30° C.: 310 MPa
Storage modulus at 60° C.: 145 MPa
Melting point: 135° C.
i: Fluorine-containing copolymer containing VdF unit, TFE unit, and acrylic acid unit
VdF/TFE=75/25 (mol %)
Content of acrylic acid: 0.7 mol %
Weight-average molecular weight: 1,200,000
Storage modulus at 30° C.: 410 MPa
Storage modulus at 60° C.: 190 MPa
Melting point: 120° C.
j: Fluorine-containing copolymer containing VdF unit, TFE unit, and 2,3,3,3-tetrafluoropropene unit
VdF/TFE/2,3,3,3-tetrafluoropropene=63.7/35.0/1.3 (mol %)
Weight-average molecular weight: 1,100,000
Storage modulus at 30° C.: 320 MPa
Storage modulus at 60° C.: 135 MPa
Melting point: 149° C.

Further, the following positive electrode active materials and conductive additives were used in Examples and Comparative Examples.

NCA: $LiNi_{0.82}Co_{0.15}Al_{0.03}O_2$
NMC811: $LiNi_{0.8}Mn_{0.1}Co_{0.1}O_2$
NMC622: $LiNi_{0.6}Mn_{0.2}Co_{0.2}O_2$
AB: Acetylene black
CNT: Multilayer carbon nanotube Example 1

(Preparation of Positive Electrode Mixture)

A fluorine-containing copolymer (c) as a binder was dissolved in N-methyl-2-pyrrolidone (NMP) to prepare a fluorine-containing copolymer (c) solution having a concentration of 8 mass %. The fluorine-containing copolymer (c) solution, NCA as a positive electrode active material, and acetylene black as a conductive additive were mixed using a stirrer to obtain a mixed solution having the composition ratio (active material/conductive additive/binder) described in Table 1. NMP was further added to and mixed with the mixed solution obtained to prepare a positive electrode mixture with a solid content of 71 mass %.

(Production of Positive Electrode Structure)

The positive electrode mixture obtained was uniformly applied onto one side of a positive electrode current collector (an aluminum foil with a thickness of 20 μm), and NMP was completely volatilized. Then, the resultant was pressed by applying a pressure of 10 t using a roll press machine to produce a positive electrode structure.

Further, the positive electrode mixture obtained was uniformly applied onto both sides of a positive electrode current collector (an aluminum foil with a thickness of 20 μm), and NMP was completely volatilized. Then, the resultant was repeatedly pressed by applying a pressure of 10 t using a roll press machine to a target thickness to produce a positive electrode structure. Table 1 shows the amount of the positive electrode mixture applied per side, the thickness of the positive electrode mixture layer per side in the positive electrode structure, and the density of the positive electrode mixture layer. Further, the positive electrode structure obtained was evaluated by the aforementioned method. Table 1 shows the results.

Examples 2 to 36 and Comparative Examples 1 to 8

A positive electrode mixture was prepared, and a positive electrode structure was produced and evaluated in the same manner as in Example 1, except that a binder was appropriately dissolved so that the concentration of the binder solution was 5 to 8 mass %, and that the type of binder, the type of conductive additive, the composition ratio, and the like were changed as described in Tables 1 to 4. Tables 1 to 4 show the results. In Example 35 and Comparative Example 8, a mixed solution having a composition ratio (active material/conductive additive (CNT)/conductive additive (AB)/binder) of 97.5/0.8/0.7/1.0 (mass %) was prepared.

TABLE 1

|  |  | Example 1 | Example 2 | Example 3 | Example 4 | Example 5 | Example 6 |
|---|---|---|---|---|---|---|---|
| Binder | | | | | | | |
| PVDF | | — | — | A | A | B | B |
| Fluorine-containing copolymer | | c | f | a | b | a | c |
| PVDF/Fluorine-containing copolymer | wt % | 0/100 | 0/100 | 85/15 | 90/10 | 80/20 | 85/15 |

TABLE 1-continued

| | | | | | | | |
|---|---|---|---|---|---|---|---|
| Configuration of electrode | | | | | | | |
| Positive electrode active material | | NCA | NCA | NCA | NCA | NCA | NCA |
| Conductive additive | | AB | AB | AB | AB | AB | AB |
| Active material/Conductive additive/Binder | wt % | 97/1.5/1.5 | 97/1.5/1.5 | 97/1.5/1.5 | 97/1.5/1.5 | 97/1.5/1.5 | 97/1.5/1.5 |
| Amount of positive electrode mixture applied | mg/cm² | 32.1 | 33.0 | 33.3 | 32.4 | 32.7 | 31.9 |
| Thickness of positive electrode mixture layer | μm | 88 | 93 | 91 | 91 | 91 | 89 |
| Density of positive electrode mixture layer | g/cm³ | 3.65 | 3.56 | 3.65 | 3.56 | 3.59 | 3.59 |
| Electrode characteristics | | | | | | | |
| Adhesion between positive electrode mixture layer and current collector | N/cm | 0.11 | 0.04 | 0.04 | 0.04 | 0.05 | 0.07 |
| Flexibility of positive electrode | φ5 mm | ○ | ○ | ○ | ○ | ○ | ○ |
| | φ3 mm | ○ | ○ | ○ | ○ | ○ | ○ |
| | φ2 mm | ○ | ○ | ○ | Δ | ○ | ○ |
| | φ1 mm | ○ | ○ | Δ | Δ | Δ | Δ |
| Battery characteristics | | | | | | | |
| Initial discharge capacity | mAh | 2169 | 2228 | 2247 | 2190 | 2209 | 2157 |

| | | Example 7 | Example 8 | Example 9 | Example 10 | Comparative example 1 | Comparative example 2 |
|---|---|---|---|---|---|---|---|
| Binder | | | | | | | |
| PVDF | | B | B | B | E | A | C |
| Fluorine-containing copolymer | | d | f | g | a | — | — |
| PVDF/Fluorine-containing copolymer | wt % | 70/30 | 70/30 | 60/40 | 60/40 | 100/0 | 100/0 |
| Configuration of electrode | | | | | | | |
| Positive electrode active material | | NCA | NCA | NCA | NCA | NCA | NCA |
| Conductive additive | | AB | AB | AB | AB | AB | AB |
| Active material/Conductive additive/Binder | wt % | 97/1.5/1.5 | 97/1.5/1.5 | 97/1.5/1.5 | 97/1.5/1.5 | 97/1.5/1.5 | 97/1.5/1.5 |
| Amount of positive electrode mixture applied | mg/cm² | 31.9 | 31.9 | 32.0 | 32.4 | 32.4 | 33.0 |
| Thickness of positive electrode mixture layer | μm | 89 | 89 | 89 | 89 | 92 | 91 |
| Density of positive electrode mixture layer | g/cm³ | 3.61 | 3.61 | 3.62 | 3.64 | 3.54 | 3.64 |
| Electrode characteristics | | | | | | | |
| Adhesion between positive electrode mixture layer and current collector | N/cm | 0.07 | 0.05 | 0.09 | 0.04 | 0.04 | 0.12 |
| Flexibility of positive electrode | φ5 mm | ○ | ○ | ○ | ○ | Δ | Δ |
| | φ3 mm | ○ | ○ | ○ | ○ | x | x |
| | φ2 mm | ○ | ○ | ○ | ○ | x | x |
| | φ1 mm | Δ | Δ | Δ | Δ | x | x |
| Battery characteristics | | | | | | | |
| Initial discharge capacity | mAh | 2158 | 2158 | 2161 | 2190 | — | — |

TABLE 2

| | | Example 11 | Example 12 | Example 13 | Example 14 | Example 15 | Example 16 |
|---|---|---|---|---|---|---|---|
| Binder | | | | | | | |
| PVDF | | — | — | A | A | B | B |
| Fluorine-containing copolymer | | c | f | a | b | a | c |
| PVDF/Fluorine-containing copolymer | wt % | 0/100 | 0/100 | 85/15 | 90/10 | 80/20 | 85/15 |
| Configuration of electrode | | | | | | | |
| Positive electrode active material | | NMC622 | NMC622 | NMC811 | NMC622 | NMC811 | NMC811 |
| Conductive additive | | AB | AB | AB | AB | AB | AB |
| Active material/Conductive additive/Binder | wt % | 97/1.5/1.5 | 97/1.5/1.5 | 97/1.5/1.5 | 97/1.5/1.5 | 97/1.5/1.5 | 97/1.5/1.5 |
| Amount of positive electrode mixture applied | mg/cm² | 32.1 | 32.7 | 31.8 | 31.6 | 31.3 | 31.6 |
| Thickness of positive electrode mixture layer | μm | 89 | 91 | 89 | 89 | 88 | 87 |

TABLE 2-continued

| | | | | | | | |
|---|---|---|---|---|---|---|---|
| Density of positive electrode mixture layer | g/cm³ | 3.61 | 3.61 | 3.58 | 3.54 | 3.57 | 3.63 |
| | | | Electrode characteristics | | | | |
| Adhesion between positive electrode mixture layer and current collector | N/cm | 0.12 | 0.04 | 0.04 | 0.04 | 0.06 | 0.07 |
| Flexibility of positive electrode | φ5 mm | ○ | ○ | ○ | ○ | ○ | ○ |
| | φ3 mm | ○ | ○ | ○ | ○ | ○ | ○ |
| | φ2 mm | ○ | ○ | ○ | Δ | ○ | ○ |
| | φ1 mm | ○ | ○ | Δ | Δ | Δ | Δ |
| | | | Battery characteristics | | | | |
| Initial discharge capacity | mAh | 1898 | 1931 | 2141 | 1865 | 2103 | 2122 |

| | | Example 17 | Example 18 | Example 19 | Example 20 |
|---|---|---|---|---|---|
| | | Binder | | | |
| PVDF | | B | B | B | C |
| Fluorine-containing copolymer | | d | f | s | a |
| PVDF/Fluorine-containing copolymer | wt % | 70/30 | 70/30 | 60/40 | 80/20 |
| | | Configuration of electrode | | | |
| Positive electrode active material | | NMC811 | NMC811 | NMC622 | NMC811 |
| Conductive additive | | AB | AB | AB | AB |
| Active material/Conductive additive/Binder | wt % | 97/1.5/1.5 | 97/1.5/1.5 | 97/1.5/1.5 | 97/1.5/1.5 |
| Amount of positive electrode mixture applied | mg/cm² | 31.4 | 31.4 | 31.6 | 32.1 |
| Thickness of positive electrode mixture layer | μm | 87 | 87 | 89 | 88 |
| Density of positive electrode mixture layer | g/cm³ | 3.63 | 3.62 | 3.54 | 3.67 |
| | | Electrode characteristics | | | |
| Adhesion between positive electrode mixture layer and current collector | N/cm | 0.08 | 0.06 | 0.10 | 0.11 |
| Flexibility of positive electrode | φ5 mm | ○ | ○ | ○ | ○ |
| | φ3 mm | ○ | ○ | ○ | ○ |
| | φ2 mm | ○ | ○ | ○ | ○ |
| | φ1 mm | Δ | Δ | Δ | Δ |
| | | Battery characteristics | | | |
| Initial discharge capacity | mAh | 2112 | 2112 | 1865 | 2160 |

TABLE 3

| | | Example 21 | Example 22 | Example 23 | Example 24 | Example 25 | Example 26 | Example 27 |
|---|---|---|---|---|---|---|---|---|
| | | Binder | | | | | | |
| PVDF | | C | C | C | C | C | C | D |
| Fluorine-containing copolymer | | b | c | e | g | h | i | i |
| PVDF/Fluorine-containing copolymer | wt % | 70/30 | 70/30 | 90/10 | 75/25 | 60/40 | 80/20 | 50/50 |
| | | Configuration of electrode | | | | | | |
| Positive electrode active material | | NMC622 | NMC811 | NMC811 | NMC811 | NMC811 | NMC811 | NMC811 |
| Conductive additive | | AB | AB | AB | AB | AB | AB | AB |
| Active material/Conductive additive/Binder | wt % | 97/1.5/1.5 | 97/1.5/1.5 | 97/1.5/1.5 | 97/1.5/1.5 | 97/1.5/1.5 | 97/1.5/1.5 | 97/1.5/1.5 |
| Amount of positive electrode mixture applied | mg/cm² | 35.1 | 31.8 | 33.0 | 31.2 | 31.6 | 32.4 | 31.3 |
| Thickness of positive electrode mixture layer | μm | 89 | 87 | 92 | 86 | 89 | 92 | 86 |
| Density of positive electrode mixture layer | g/cm³ | 3.66 | 3.66 | 3.60 | 3.65 | 3.54 | 3.54 | 3.64 |
| | | Electrode characteristics | | | | | | |
| Adhesion between positive electrode mixture layer and current collector | N/cm | 0.10 | 0.13 | 0.13 | 0.13 | 0.09 | 0.13 | 0.10 |
| Flexibility of positive electrode | φ5 mm | ○ | ○ | ○ | ○ | ○ | ○ | ○ |
| | φ3 mm | ○ | ○ | ○ | ○ | ○ | ○ | ○ |
| | φ2 mm | ○ | ○ | Δ | ○ | ○ | ○ | ○ |
| | φ1 mm | Δ | Δ | Δ | Δ | Δ | Δ | Δ |

TABLE 3-continued

| Battery characteristics | | | | | | | |
|---|---|---|---|---|---|---|---|
| Initial discharge capacity | mAh | 2074 | 2141 | 2217 | 2099 | 2122 | 2179 | 2103 |

| | | Example 28 | Example 29 | Example 30 | Example 31 | Comparative example 3 | Comparative example 4 |
|---|---|---|---|---|---|---|---|
| Binder | | | | | | | |
| PVDF | | E | F | G | G | A | C |
| Fluorine-containing copolymer | | a | a | a | g | — | — |
| PVDF/Fluorine-containing copolymer | wt % | 60/40 | 85/15 | 70/30 | 60/40 | 100/0 | 100/0 |
| Configuration of electrode | | | | | | | |
| Positive electrode active material | | NMC811 | NMC811 | NMC811 | NMC811 | NMC811 | NMC811 |
| Conductive additive | | AB | AB | AB | AB | AB | AB |
| Active material/Conductive additive/Binder | wt % | 97/1.5/1.5 | 97/1.5/1.5 | 97/1.5/1.5 | 97/1.5/1.5 | 97/1.5/1.5 | 97/1.5/1.5 |
| Amount of positive electrode mixture applied | mg/cm$^2$ | 31.6 | 31.6 | 31.0 | 32.4 | 32.4 | 32.1 |
| Thickness of positive electrode mixture layer | μm | 88 | 87 | 88 | 90 | 90 | 89 |
| Density of positive electrode mixture layer | g/cm$^3$ | 3.61 | 3.63 | 3.52 | 3.62 | 3.62 | 3.63 |
| Electrode characteristics | | | | | | | |
| Adhesion between positive electrode mixture layer and current collector | N/cm | 0.05 | 0.08 | 0.08 | 0.12 | 0.04 | 0.13 |
| Flexibility of positive electrode | φ5 mm | ○ | ○ | ○ | ○ | Δ | Δ |
| | φ3 mm | ○ | ○ | ○ | ○ | x | x |
| | φ2 mm | ○ | ○ | ○ | ○ | x | x |
| | φ1 mm | Δ | Δ | Δ | Δ | x | x |
| Battery characteristics | | | | | | | |
| Initial discharge capacity | mAh | 2122 | 2122 | 2084 | 2179 | — | — |

TABLE 4

| | | Example 32 | Example 33 | Example 34 | Example 35 | Example 36 |
|---|---|---|---|---|---|---|
| Binder | | | | | | |
| PVDF | | — | B | B | B | B |
| Fluorine-containing copolymer | | d | a | a | a | j |
| PVDF/Fluorine-containing copolymer | wt % | 0/100 | 75/25 | 70/30 | 80/20 | 75/25 |
| Configuration of electrode | | | | | | |
| Positive electrode active material | | NMC622 | NMC622 | NMC622 | NMC622 | NMC622 |
| Conductive additive | | AB | AB | CNT | CNT + AB | AB |
| Active material/Conductive additive/Binder | wt % | 97/1.5/1.5 | 97/1.5/1.5 | 98/1.0/1.0 | 97.5/0.8 + 0.7/1.0 | 97/1.5/1.5 |
| Amount of positive electrode mixture applied | mg/cm$^2$ | 25.6 | 26.0 | 25.6 | 25.1 | 25.1 |
| Thickness of positive electrode mixture layer | μm | 71 | 74 | 72 | 71 | 69 |
| Density of positive electrode mixture layer | g/cm$^3$ | 3.61 | 3.51 | 3.56 | 3.53 | 3.63 |
| Electrode characteristics | | | | | | |
| Adhesion between positive electrode mixture layer and current collector | N/cm | 0.20 | 0.10 | 0.14 | 0.12 | 0.10 |
| Flexibility of positive electrode | φ3 mm | ○ | ○ | ○ | ○ | ○ |
| | φ2.5 mm | ○ | ○ | ○ | ○ | ○ |
| | φ2 mm | ○ | ○ | ○ | ○ | ○ |
| | φ1 mm | ○ | ○ | Δ | Δ | ○ |
| Battery characteristics | | | | | | |
| Initial discharge capacity | mAh | 1513 | 1537 | 1529 | 1488 | 1480 |

TABLE 4-continued

|  |  | Comparative example 5 | Comparative example 6 | Comparative example 7 | Comparative example 8 |
|---|---|---|---|---|---|
| Binder | | | | | |
| PVDF | | A | C | A | C |
| Fluorine-containing copolymer | | — | — | — | — |
| PVDF/Fluorine-containing copolymer | wt % | 100/0 | 100/0 | 100/0 | 100/0 |
| Configuration of electrode | | | | | |
| Positive electrode active material | | NMC622 | NMC622 | NMC622 | NMC622 |
| Conductive additive | | AB | AB | CNT | CNT + AB |
| Active material/Conductive additive/Binder | wt % | 97/1.5/1.5 | 97/1.5/1.5 | 98/1.0/1.0 | 97.5/0.8 + 0.7/1.0 |
| Amount of positive electrode mixture applied | mg/cm$^2$ | 25.6 | 26.2 | 25.3 | 25.6 |
| Thickness of positive electrode mixture layer | μm | 73 | 73 | 71 | 72 |
| Density of positive electrode mixture layer | g/cm$^3$ | 3.53 | 3.61 | 3.57 | 3.56 |
| Electrode characteristics | | | | | |
| Adhesion between positive electrode mixture layer and current collector | N/cm | 0.10 | 0.24 | 0.14 | 0.27 |
| Flexibility of positive electrode | ϕ3 mm | ○ | ○ | ○ | ○ |
|  | ϕ2.5 mm | Δ | ○ | x | Δ |
|  | ϕ2 mm | x | x | x | x |
|  | ϕ1 mm | x | x | x | x |
| Battery characteristics | | | | | |
| Initial discharge capacity | mAh | — | — | — | — |

The invention claimed is:

1. A positive electrode structure comprising:
a current collector; and
a positive electrode mixture layer provided on one or each of both sides of the current collector, wherein
the positive electrode mixture layer has a thickness of 69 μm or more,
the positive electrode mixture layer has a density of 3.0 to 5.0 g/cm$^3$,
the positive electrode mixture layer comprises a positive electrode active material and a binder,
the positive electrode active material comprises a lithium-nickel composite oxide,
the binder comprises a fluorine-containing copolymer, and
the fluorine-containing copolymer comprises a vinylidene fluoride unit and a fluorinated monomer unit, provided that the vinylidene fluoride unit is excluded from the fluorinated monomer unit.

2. The positive electrode structure according to claim 1, wherein
the fluorine-containing copolymer has a storage modulus (E') at 30° ° C. of 100 to 1,100 MPa and a storage modulus (E') at 60° ° C. of 50 to 500 MPa, as measured by dynamic viscoelasticity.

3. The positive electrode structure according to claim 1, wherein
a content of the vinylidene fluoride unit in the fluorine-containing copolymer is 57.0 mol % or more with respect to all monomer units.

4. The positive electrode structure according to claim 1, wherein
a content of the fluorinated monomer unit in the fluorine-containing copolymer is 5.0 mol % or more with respect to all monomer units.

5. The positive electrode structure according to claim 1, wherein
a content of the binder is 0.3 to 3.0 mass % with respect to the mass of the positive electrode mixture layer.

6. The positive electrode structure according to claim 1, wherein
the positive electrode mixture layer is formed by applying a positive electrode mixture containing the positive electrode active material, the binder, and an organic solvent, and
an amount of the positive electrode mixture applied is 22.0 mg/cm$^2$ or more.

7. The positive electrode structure according to claim 1, wherein
the fluorine-containing copolymer has a melting point of 100 to 170° C.

8. The positive electrode structure according to claim 1, wherein
a content of the fluorine-containing copolymer in the binder is 5 mass % or more with respect to the mass of the binder.

9. A secondary battery comprising the positive electrode structure according to claim 1.

* * * * *